US006512033B1

(12) United States Patent
Wu

(10) Patent No.: US 6,512,033 B1
(45) Date of Patent: Jan. 28, 2003

(54) POLYURETHANE SEALANT COMPOSITIONS

(75) Inventor: Ziyan Wu, Farmington Hills, MI (US)

(73) Assignee: Essex Specialty Products Inc., Auburn Hills, MI (US)

( * ) Notice: Subject to any disclaimer, the term of this patent is extended or adjusted under 35 U.S.C. 154(b) by 0 days.

(21) Appl. No.: 09/498,084

(22) Filed: Feb. 4, 2000

Related U.S. Application Data

(60) Provisional application No. 60/118,884, filed on Feb. 5, 1999.

(51) Int. Cl.[7] .................................................. C08J 5/52

(52) U.S. Cl. .......................... 524/128; 528/28; 528/29; 528/38; 156/330; 428/422.8; 428/426; 428/457

(58) Field of Search ........................... 524/128; 528/28, 528/29, 38; 428/422.8, 426, 457; 156/330; 52/208

(56) References Cited

U.S. PATENT DOCUMENTS

| | | | | |
|---|---|---|---|---|
| 3,502,704 A | | 3/1970 | McKellar | 260/448.8 |
| 3,627,722 A | | 12/1971 | Selter | 260/37 |
| 3,707,521 A | | 12/1972 | De Santis | 260/37 |
| 3,779,794 A | | 12/1973 | De Santis | 117/72 |
| 3,864,135 A | * | 2/1975 | Kuehn | |
| 3,886,226 A | | 5/1975 | Asai et al. | 260/77.5 |
| 4,284,751 A | | 8/1981 | Hatt | 528/45 |
| 4,345,053 A | | 8/1982 | Rizk et al. | 525/440 |
| 4,374,237 A | | 2/1983 | Berger et al. | 528/28 |
| 4,419,513 A | | 12/1983 | Breidenbach et al. | 544/222 |
| 4,539,345 A | | 9/1985 | Hansen | 523/219 |
| 4,555,561 A | | 11/1985 | Sugimori | 528/26 |
| 4,625,012 A | | 11/1986 | Rizk et al. | 528/28 |
| 4,640,969 A | | 2/1987 | Goel et al. | 528/73 |
| 4,643,794 A | | 2/1987 | Saracsan et al. | 156/310 |
| 4,681,926 A | | 7/1987 | Goel | 528/48 |
| 4,687,533 A | | 8/1987 | Rizk et al. | 156/307 |
| 4,758,648 A | | 7/1988 | Rizk et al. | 528/53 |
| 4,780,520 A | | 10/1988 | Rizk et al. | 528/53 |
| 5,063,269 A | | 11/1991 | Hung | 524/296 |
| 5,086,151 A | | 2/1992 | Ito et al. | 528/53 |
| 5,110,892 A | | 5/1992 | Graham | 528/48 |
| 5,206,200 A | | 4/1993 | Bush et al. | 502/167 |
| 5,288,839 A | | 2/1994 | Greco | 528/204 |
| 5,302,303 A | | 4/1994 | Clatty et al. | 252/6.5 |
| 5,342,867 A | | 8/1994 | Ryan et al. | 524/101 |
| 5,409,961 A | | 4/1995 | Green | 521/78 |
| 5,489,618 A | | 2/1996 | Gerkin | 521/128 |
| 5,623,044 A | | 4/1997 | Chiao | 528/28 |

OTHER PUBLICATIONS

JP05043643A, English abstract, Feb. 23, 1999.*
JP 05170857A, English abstract, Jul. 9, 1993.*
Dover Chemical Corp., *Doverphos* 675, 12 and 7, pp. 2, 3 and 4 Date Unavailable.
Witco, *Properties and Applicatins of Fomrez / Eurecat Catalysts* p. 5 Date Unavailable.

* cited by examiner

*Primary Examiner*—Margaret Medley
(74) *Attorney, Agent, or Firm*—Norman L. Sims

(57) ABSTRACT

In one aspect, this invention is a polyurethane sealant composition comprising (1) a urethane prepolymer having an isocyante functionality of at least about 2.0 and a weight average molecular weight of at least about 2,000;

(2) a catalytic amount of a tin compound which catalyzes the reaction of isocyanate moieties with water or an active hydrogen containing compound; and (3) a stabilizing amount of an organophosphite which has an alkaryl ligand or both an aliphatic ligand and an aromatic ligand. The prepolymer may further comprises silane functionality or the composition may further comprise a compound or polymer which contains silane moieties and is compatible with the polyurethane prepolymer. The invention is also a method for bonding glass to a substrate which comprises contacting a sealant according to the invention with glass and another substrate with the sealant disposed between the glass and substrate and thereafter allowing the sealant to cure so as to bond the glass to the substrate.

19 Claims, No Drawings

POLYURETHANE SEALANT COMPOSITIONS

CROSS REFERENCE TO RELATED APPLICATION

This application claims the benefit of U.S. Provisional Application No. 60/118,884 filed on Feb. 5, 1999.

BACKGROUND OF THE INVENTION

This invention relates to polyurethane sealant compositions which are capable of being used without the need for a primer.

Polyurethane sealant compositions typically comprise at least one urethane prepolymer. Sealants useful for bonding to non-porous substrates, such as glass are described, for example, in U.S. Pat. No. 4,374,237 and U.S. Pat. No. 4,687,533, both incorporated herein by reference. U.S. Pat. No. 4,374,237 describes a polyurethane sealant containing urethane prepolymers which have been further reacted with secondary amine compounds containing two silane groups. U.S. Pat. No. 4,687,533 describes a polyurethane sealant containing urethane prepolymers which contain silane groups which have been prepared by reacting a polyisocyanate having at least three isocyanate groups with less than an equivalent amount of an alkoxysilane having a terminal group containing active hydrogen atoms reactive with isocyanate groups to form an isocyanatosilane having at least two unreacted isocyanate groups. In a second step, the isocyanatosilane is mixed with additional polyisocyanate and the mixture is reacted with a polyol to form a polyurethane prepolymer having terminal isocyanato groups and pendant alkoxysilane groups.

However, when such sealants are used to bond glass substrates to painted substrates, such as for window installation in vehicle manufacturing, the lap shear strength of the bonded substrate may be less than desirable for safety or structural purposes. Consequently, a separate paint primer comprising a solution of one or more silanes is typically applied to a painted substrate prior to the application of the sealant in most vehicle assembly operations for bonding the windshield and the rear window. The use of a primer in assembly operations is undesirable in that it introduces an extra step, additional cost, the risk of marring the paint surface if dripped on an undesired location and exposes the assembly line operators to additional chemicals. It would be desirable to provide a polyurethane sealant which, when bonded to a painted substrate and cured, provides a bonded substrate with a higher lap shear strength, particularly when used in the absence of a paint primer.

SUMMARY OF THE INVENTION

In one aspect, this invention is a polyurethane sealant composition comprising (1) a urethane prepolymer having an isocyanate functionality of at least about 2.0 and a weight average molecular weight of at least about 2,000;

(2) a catalytic amount of a tin compound which catalyzes the reaction of isocyanate moieties and water or an active hydrogen containing compound; and (3) a stabilizing amount of an organophosphite which has an alkaryl ligand or both an aliphatic ligand and an aromatic ligand.

In a preferred embodiment the prepolymer further comprises silane functionality or the composition further comprises a compound or polymer which contains silane moieties and is compatible with the polyurethane prepolymer.

In another embodiment the invention is a method for bonding glass to a substrate which comprises contacting a sealant according to the invention with glass and another substrate with the sealant disposed between the glass and substrate and thereafter allowing the sealant to cure so as to bond the glass to the substrate.

The sealant composition of the invention is useful in bonding glass substrates to plastic, metal, fiberglass and composite substrates which may or may not be painted. The sealant composition gives unexpectedly high lap shear strength when no primer compositions have previously been applied to a painted plastic, metal, fiberglass or composite substrate. The adhesive compositions of the invention bond to acid resistant coating systems without the need for primers, achieve faster link-up in low temperature conditions and maintain adhesion when exposed to weathering conditions.

DETAILED DESCRIPTION OF THE INVENTION

The prepolymers used in the invention can be conventional prepolymers used in polyurethane adhesive compositions. In a preferred embodiment the prepolymers are blended with a compound or polymer having silane functionality. In another preferred embodiment the prepolymer contains silane functionality as well as isocyanate functionality. A urethane prepolymer having silane functionality may be the entire prepolymer used in the adhesive or it may be blended with a prepolymer which does not have silane functionality.

Preferable urethane prepolymers for use in preparing the composition of the invention include any compound having an average isocyanate functionality of at least about 2.0 and a molecular weight of at least about 2,000. Preferably, the average isocyanate functionality of the prepolymer is at least about 2.2, and is more preferably at least about 2.4. Preferably the isocyanate functionality is no greater than about 4.0, more preferably, no greater than about 3.5 and most preferably, no greater than about 3.0. Preferably, the weight average molecular weight of the prepolymer is at least about 2,500, and is more preferably at least about 3,000; and is preferably no greater than about 40,000, even more preferably no greater than about 20,000, more preferably, no greater than about 15,000 and is most preferably no greater than about 10,000. The prepolymer may be prepared by any suitable method, such as by reacting an isocyanate-reactive compound containing at least two isocyanate-reactive groups with an excess over stoichiometry of a polyisocyanate under reaction conditions sufficient to form the corresponding prepolymer.

Suitable polyisocyanates for use in preparing the prepolymer include any aliphatic, cycloaliphatic, araliphatic, heterocyclic or aromatic polyisocyanate, or mixture thereof. Preferably the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and is most preferably no greater than about 3.0. Higher functionality may also be used, but may cause excessive cross-linking, and result in an adhesive which is too viscous to handle and apply easily, and can cause the cured adhesive to be too brittle. Preferably, the equivalent weight of the polyisocyanate is at least about 100, more preferably at least about 110, and is most preferably at least about 120; and is preferably no greater than about 300, more preferably no greater than about 250, and is most preferably no greater than about 200.

Examples of useful polyisocyanates include ethylene diisocyanate, isophorone diisocyanate, bis(4-isocyanate cyclohexyl) methane, trimethyl hexamethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato3, 3,5-trimethyl-5-isocyanato methyl cyclohexane (see e.g., German Auslegeschrift No. 1,202,785); 2,4- and 2,6-hexahydrotolylene diisocyanate and mixtures of these isomers, hexahydro1,3- and/or 1,4-phenylene diisocyanate, perhydro2,5'- and/or 4,4'-diphenyl methane diiso-cyanate, 1,3- and 1,4-phenylene diisocyanate, 2,4'- and 2,6-tolylene diisocyanate and mixtures of these isomers, diphenylmethane2,4'- and/or 4,4'-diisocyanate, naphthylene-1,5-diisocyanate, triphenylmethane4,4',4"-triisocyanate, tetramethylxylene diisocyanates, polymeric derivatives of the previously described isocyanates, polyphenyl polymethylene polyisocyanates of the type obtained by condensing aniline with formaldehyde, followed by phosgenation and such as described, for example, in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789, 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567,763 and in German Patent 1,231,688 and reaction products of the aforementioned isocyanates with acetals as described in German Patent 1,072,385. Preferred isocyanates are aromatic isocyanates. More preferred polyisocyanates include diphenylmethane-4,4'-diisocyanate and polymeric derivatives thereof, isophorone diisocyanate, tetramethylxylene diisocyanate,1,6-hexamethylene diisocyante and polymeric derivatives thereof, bis(4-isocyanatocylohexyl)methane, and trimethyl hexamethylene diisocyanate. The most preferred isocyanate is diphenyl methane diisocyanate.

The term "isocyanate-reactive compound" as used herein includes any organic compound having at least two isocyanate-reactive moieties, such as a compound containing an active hydrogen moiety, or an iminofunctional compound. For the purposes of this invention, an active hydrogen containing moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —$NH_2$, —NH—, —$CONH_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate-reactive compound is a polyol, and is more preferably a polyether polyol.

Suitable polyols useful in the preparation of the prepolymers include, for example, polyether polyols, polyester polyols, poly(alkylene carbonate)polyols, hydroxyl-containing polythioethers, polymer polyols, and mixtures thereof. Polyether polyols are well-known in the art and include, for example, polyoxyethylene, polyoxypropylene, polyoxybutylene, and polytetramethylene ether diols and triols which are prepared by reacting an unsubstituted or halogen- or aromatic-substituted ethylene oxide or propylene oxide with an initiator compound containing two or more active hydrogen groups such as water, ammonia, a polyalcohol, or an amine. Such methods are described, for example, in U.S. Pat. Nos. 4,269,945; 4,218,543; and 4,374,210; which are hereby incorporated by reference in their entirety. In general, polyether polyols may be prepared by polymerizing alkylene oxides in the presence of an active hydrogen-containing initiator compound. Most preferred, however, are ethylene oxide-capped polyols prepared by reacting glycerin with propylene oxide, followed by reacting with ethylene oxide.

Suitable alkylene oxides include ethylene oxide, propylene oxide, butylene oxides, styrene oxide, epichlorohydrin, epibromohydrin, and mixtures thereof. Suitable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenyls, novolac resins, phosphoric acid, amines, and mixtures thereof.

Polyester polyols are also well-known in the art and may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, an mixtures thereof. Examples of suitable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

Suitable polymer polyols include dispersions of polymers of vinyl monomers in a continuous polyol phase, particularly dispersions of styrene/acrylonitrile copolymers. Also useful are the so-called polyisocyanate polyaddition (PIPA) polyols (dispersions of polyurea-polyurethane particles in a polyol) and the polyurea dispersions in polyols (PHD polyols). Copolymer polyols of the vinyl type are described, for example, in U.S. Pat. Nos. 4,390,645, 4,463,107, 4,148,840 and 4,574,137, all incorporated by reference.

Preferably, the isocyanate-reactive compound has a functionality of at least about 1.5, more preferably at least about 1.8, and is most preferably at least about 2.0; and is preferably no greater than about 4.0, more preferably no greater than about 3.5, and is most preferably no greater than about 3.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500.

The prepolymer may be prepared by any suitable method, such as bulk polymerization and solution polymerization. The reaction to prepare the prepolymer is carried out under anhydrous conditions, preferably under an inert atmosphere such as a nitrogen blanket, to prevent cross-linking of the isocyanate groups by atmospheric moisture. The reaction is preferably carried out at a temperature between 0° C. and 150° C., more preferably between 25° C. and 80° C., until the residual isocyanate content determined by titration of a sample is very close to the desired theoretical value. The isocyanate content in the prepolymers is preferably in the range of about 0.1 percent to about 10 percent, more preferably in the range of about 1.5 percent to about 5.0 percent and most preferably in the range of about 1.8 percent to about 3.0 percent.

The prepolymer is present in the sealant composition in sufficient amount such that the sealant is capable of bonding glass to metal, plastic, fiberglass or composite substrates, preferably the substrates are painted and more preferably the substrates are painted with acid resistant paints. Preferably the polyurethane prepolymer is present in an amount of about 30 percent by weight or greater based on the weight of the sealant, more preferably about 50 percent by weight or greater and most preferably about 65 percent by weight or greater. Preferably the polyurethane prepolymer is present in an amount of about 99.8 percent by weight or less based on the weight of the sealant, more preferably about 98 percent by weight or less and most preferably about 85 percent by weight or less.

In those embodiments where the sealant is used to bond glass to substrates coated with acid resistant paints it is desirable to have a silane present in some form. The silane may be blended with the prepolymer. In another embodiment the silane is a silane which has an active hydrogen atom which is reactive with an isocyanate. Preferably such silane is a mercapto-silane or an amino-silane and more preferably is a mercapto-trialkoxy-silane or an amino-trialkoxy silane. In one embodiment, the silane having, an active hydrogen atom reactive with isocyanate moieties, can be reacted with the terminal isocyanate moieties of the prepolymer. Such reaction products are disclosed in U.S. Pat. Nos. 4,374,237 and 4,345,053 relevant parts incorporated herein by reference In yet another embodiment, the silane having a reactive hydrogen moiety reactive with an isocyanate moiety can be reacted into the backbone of the prepolymer by reacting such silane with the starting materials during the preparation of the prepolymer . The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer reacted with a polyurethane prepolymer or reacted with a polyisocyanate and a compound having on average more than one moiety reactive with an isocyanate moiety. Preferably the adduct is a reaction product of a secondary amino- or mercapto-alkoxy silane and a polyisocyanate, the adduct having an average of at least one silane group and at least one isocyanate group per molecule (hereinafter "adduct"). Preferably the adduct has at least about 1.5 isocyanate groups and at least about one silane group per molecule, and most preferably has at least about two isocyanate groups and at least about one silane group per molecule. The adduct level in the sealant compositions is preferably in the range of about 0.5 percent to about 20 percent, more preferably in the range of about 1.0 percent to about 10 percent and most preferably in the range of about 2.0 percent to about 7 percent. The adduct may be prepared by any suitable method, such as, for example, by reacting an secondary amino- or mercapto-alkoxy silane with a polyisocyanate compound. Suitable polyisocyanates for use in preparing the adduct include those described above as suitable for use in preparing the prepolymer, particularly including isopherone diisocyanate, polymethylene polyphenylisocyanates, and aliphatic polyisocyanates such as hexamethylene diisocyanate. Preferably, the polyisocyanate is an aliphatic polyisocyanate and is most preferably an aliphatic polyisocyanate based on hexamethylene diisocyante with an equivalent weight of about 195. The polyisocyanate used to prepare the isocyanate silane adduct preferably has a molecular weight of less than about 2,000, more preferably less than about 1,000. Suitable organofunctional silanes include amino- or mercapto-alkoxysilanes of the formula:

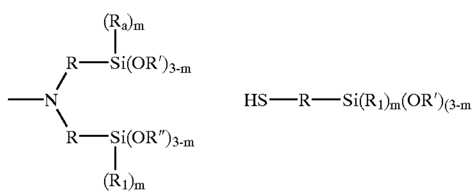

wherein R is a divalent organic group, preferably $C_{1-4}$ alkylene, R', R", $R_1$ and Ra are hydrogen or alkyl, preferably $C_{1-4}$ alkyl, m is an integer from 0 to 2. Examples of such compounds include: N,N-bis[(3-triethoxysilyl)propyl] amine; N,N-bis[(3-tripropoxy-silyl)propyl]amine; N-(3-trimethoxysilyl)propyl-3-[N-(3-trimethoxysilyl)-propylamino]propionamide; N-(3-triethoxysilyl)propyl-3-[N-3-triethoxysilyl)-propyl-amino]propionamide; N-(3-trimethoxysilyl)propyl-3-[N-3-triethoxysilyl)-propylamino] propionamide; 3-trimethoxysilylpropyl 3-[N-(3-trimethoxysilyl)-propylamino]-2-methyl propionate; 3-triethoxysilylpropyl 3-[N-(3-triethoxysilyl)-propylamino]-2-methyl propionate; 3-trimethoxysilylpropyl 3-[N-(3-triethoxysilyl)-propylamino]-2-methyl propionate; and the like. Preferably the organofunctional silane is gamma-mercaptopropyl-trimethoxysilane (available as Al 89 from Union Carbide) or N,N'-bis((3-trimethoxysilyl) propyl)amine.

In preparing the adduct, the silane and the polyisocyanate reactants are preferably combined so that the ratio of isocyanate groups to secondary amine or mercapto groups in the reaction mixture to prepare the adduct is at least about 1.5, more preferably at least about 2.0, and most preferably at least about 2.5; and is preferably no greater than about 6.0, more preferably no greater than about 5.5, and most preferably no greater than about 5.0. The adduct may be prepared by any suitable method, such as bulk or solution polymerization. The reaction between the polyisocyanate and the organofunctional silane is preferably carried out under anhydrous conditions, preferably under an inert atmosphere such as a nitrogen blanket, to prevent premature hydrolysis of the alkoxysilane groups and/or cross-linking of the isocyanate groups by atmospheric moisture. The polyisocyanate and alkoxysilane are preferably reacted under anhydrous conditions at a temperature between room temperature (about 20° C.) and about 80° C. Depending on the reagents, an exotherm may develop so that no external heating is required. Indeed, cooling may be necessary. The reaction is generally complete within two hours and may be catalyzed with a tin catalyst, suitably a tin salt such as a tin carboxylate, if desired. The reaction is suitably carried out in heat or in an inert liquid diluent or carrier. While any of the conventional inert organic solvents such as the benzene, toluene, xylene and other hydrocarbons or halohydrocarbons can be employed, it is preferable to use a compound having plasticizing properties, since the use of a plasticizer avoids the need for isolating the active reaction products from the reaction mixtures.

The reactions to prepare the prepolymer and the adduct may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between about 0.005 and about 5 percent by weight of the mixture catalyzed, depending on the nature of the isocyanate.

The amount of silane present is that amount which enhances the adhesion of the adhesive to the painted surface without the need for a primer. The amount of silane present is preferably, about 0.1 percent by weight or greater based on the weight of the sealant and most preferably about 1.0 percent by weight or greater. The amount of silane used is preferably about 10 percent by weight or greater or less and most preferably about 2.0 percent by weight or less.

The composition of the invention also contains an organotin catalyst which catalyzes the reaction of isocyanate moieties with water or an active hydrogen containing compound. Such compounds are well known in the art. Included in the useful organotin compounds are alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^2OC(O))_2$—Sn—$(R^3)_2$ wherein $R^2$ and $R^3$ are independently in each occurrence a $C_{1-10}$ alkyl, preferably a $C_{1-3}$ alkyl and most preferably a methyl. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. The organo tin catalyst is present in an amount of about 60 parts per million or greater based on the weight of the sealant, more preferably 120 parts by million or greater. The organo tin catalyst is present in an amount of about 1.0 percent or less based on the weight of the sealant, more preferably 0.5 percent by weight or less and most preferably 0.1 percent by weight or less.

The sealant composition of the invention may also further contain a second catalyst which has good stability in the absence of atmospheric moisture, but which has a rapid cure rate in the presence of atmospheric moisture, such as a dimorpholinodialkyl ether, a di((dialkylmorpholino)alkyl) ether or a metal alkanoate, such as bismuth octoate. A preferred dimorpholinodialkyl ether is dimorpholinodiethyl ether. A preferred di((dialkylmorpholino)alkyl) ether is (di-(2-(3,5-dimethylmorpholino)ethyl)ether). The dimorpholinodialkyl ether or di((dialkylmorpholino)alkyl) ether when employed, are preferably employed in an amount, based on the weight of the sealant, of about 0.01 percent by weight or greater based on the sealant, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

The composition further comprises a stabilizing amount of an organophosphite. The organophosphite should be present in a sufficient amount to enhance the durability of bond of the adhesive composition to the paint surface and the glass surface durability of an automobile. Preferably at least one of the phosphorous atoms is bonded to an oxygen atom which is bonded to an aromatic moiety, such as a phenyl. Preferably at least one of the phosphorous atoms is bonded to an oxygen atom bonded to an alkyl moiety. Preferably at least one of the phosphorous atoms is bonded to both an aromatic moiety and an alkyl moiety through oxygen moieties. The organophosphites preferred for use in this invention are phosphites wherein the ligands on the phosphite comprise one ligand with at least one aliphatic moiety and one ligand with at least one aromatic moiety or comprises at least one ligand having both aromatic and aliphatic structure; i.e. alkaryl. Ligand as used herein refers to the groups bound to the oxygens bound to the phosphorous atoms of the phosphite. In a preferred embodiment the phosphite corresponds to one of the following formulas $$P—(OR^1)_3 \text{ or}$$

$$(R^1O)_2—P—OR^2O—P—(OR^1)_2.$$

wherein $R^1$ is independently in each occurrence alkyl, alkaryl or aryl; and $R^2$ is independently in each occurrence alkylene, alkarylene or arylene; with the proviso that $R^1$ and $R^2$ are selected such that each phosphite has at least one alkaryl group or has at least one aryl and at least one alkyl group.

Preferably $R^1$ is independently in each occurrence $C_{6-18}$ alkyl, $C_{7-30}$ alkaryl or $C_{6-20}$ aryl; more preferably $C_{6-12}$ alkyl and most preferably $C_{9-12}$ alkyl. Preferably $R^2$ is independently in each occurrence $C_{6-18}$ alkylene, $C_{7-30}$ alkarylene; or $C_{6-20}$ arylene; more preferably $C_{7-30}$ alkarylene or $C_{6-20}$ arylene; even more preferably $C_{7-30}$ alkarylene and most preferably a divalent bisphenol structure for instance 1,3 propylene diphenyl or methylene diphenyl. Preferably the divalent bisphenol is based on bisphenol A or bisphenol F. As used herein alkyl means saturated straight or branched carbon chain. Alkylene means a divalent strait or branched saturated carbon chain. Aryl as used herein refers to a monovalent group comprising one or more aromatic rings such as phenyl, biphenyl or naphthyl. Arylene as used herein refers to a bivalent group which comprises aromatic rings such as phenylene, naphthalene or biphenylene. Alkaryl as used herein means an hydrocarbon group which contains both aliphatic and aromatic structural components; for example 1,3 propylene diphenyl or nonylphenyl. Alkarylene means a divalent group which has both aliphatic and aromatic structural components; i.e. such as 1,3 propylene diphenylene or methylene diphenylene.

Among preferred organophosphites are poly (dipropyleneglycol) phenyl phosphite (available form Dover Chemical Corporation under the trademark and designation DOVERPHOS 12), tetrakis isodecyl 4,4'isopropylidene diphosphite (available form Dover Chemical Corporation under the trademark and designation DOVERPHOS 675), and phenyl diisodecyl phosphite (available form Dover Chemical Corporation under the trademark and designation DOVERPHOS 7). Preferably the organophosphite is present in an amount of about 0.1 percent by weight or greater and more preferably about 0.2 percent by weight or greater. Preferably the organophosphite is present in an amount of about 1.0 percent by weight or less and more preferably about 0.5 percent by weight or less. It has been discovered that by selection of this class of organophosphites the adhesion to certain paint surfaces is significantly enhanced.

For formulating sealant compositions, the one or more prepolymer and the silane containing compound, if present, are combined, preferably with fillers and additives known in the prior art for use in elastomeric compositions. By the addition of such materials, physical properties such as viscosity, flow rate, sag, and the like can be modified. However, to prevent premature hydrolysis of the moisture sensitive groups of the polymer, the filler should be thoroughly dried before admixture therewith. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative. The fillers are preferably present in an amount of about 15 percent by weight or greater based on the amount of the sealant. The fillers are preferably present in an amount of about 70 percent by weight or less based on the sealant, more preferably 50 percent by weight or less and even more preferably 30 percent by weight or less.

The sealant composition also preferably contains one or more plasticizers or solvents to modify Theological properties to a desired consistency. Such materials should be free of water, inert to isocyanate groups, and compatible with the polymer. Such material may be added to the reaction mixtures for preparing the prepolymer or the adduct, or to the mixture for preparing the final sealant composition, but is preferably added to the reaction mixtures for preparing the prepolymer and the adduct, so that such mixtures may be more easily mixed and handled. Suitable plasticizers and solvents are well-known in the art and include dioctyl phthalate, dibutyl phthalate, a partially hydrogenated terpene commercially available as "HB-40", trioctyl phosphate, epoxy plasticizers, toluene-sulfamide, chloroparaffins, adipic acid esters, castor oil, xylene, 1-methyl-2-pyrolidinone and toluene. The amount of plasticizer used is that amount sufficient to give the desired Theological properties and disperse the components in the sealant composition. Preferably the plasticizer is present in an amount of about 0 percent by weight or greater, more preferably about 5 percent by weight or greater and most preferably about 10 percent by weight or greater. The plasticizer is preferably present in an amount of about 45 percent by weight or less and about 40 percent by weight or less and most preferably about 20 parts by weight or less.

The sealant composition of this invention may be formulated by blending the components together using means well-known in the art. Generally the components are blended in a suitable mixer. Such blending is preferably conducted in an inert atmosphere and atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components. Once the sealant composition is formulated, it is packaged in a suitable container such that it is protected from atmospheric moisture. Contact with atmospheric moisture could result in premature cross-linking of the polyurethane prepolymer-containing isocyanate groups.

The sealant composition of the invention is used to bond porous and nonporous substrates together. The sealant composition is applied to a substrate and the adhesive on the first substrate is thereafter contacted with a second substrate. Thereafter the adhesive is exposed to curing conditions. In a preferred embodiment one substrate is glass and the other substrate is a plastic, metal, fiberglass or composite substrate which may optionally be painted. This method is especially effective for substrates painted with an acid resistant paint. In preferred embodiments, the surfaces to which the adhesive is applied are cleaned prior to application, see for example U.S. Pat. Nos. 4,525,511, 3,707,521 and 3,779,794. Generally the sealants of the invention are applied at ambient temperature in the presence of atmospheric moisture. Exposure to atmospheric moisture is sufficient to result in curing of the sealant. Curing may be further accelerated by applying heat to the curing sealant by means of convection heat, or microwave heating.

This sealant can be formulated to be applied to a painted surface, such as an automobile window flange, without the need to put a primer on the surface of the substrate prior to application of the sealant. Preferably in this embodiment the sealant contains silane either in the form of a prepolymer or as an additive as described hereinbefore. In another embodiment the sealant can be formulated without the presence of silane. In this embodiment a primer is generally applied to the surface of the substrate, such as an automobile window flange, prior to contacting the sealant to the second substrate. Primers which may be used are well known to those skilled in the art. In the embodiment where one of the substrates is glass, the glass is preferably contacted with a primer prior to the application of the sealant. Examples of useful primers for painted surfaces such as automobile window flanges are BetaSeal 43530 primer available from Essex Specialty Products, Inc. Examples of useful primers for glass surfaces include BetaSeal 43518 primer and BetaSeal 43520A primer available from Essex Specialty Products, Inc.

The sealants of this invention are especially effective in bonding to acid resistant points, such as, DuPonts Gen IVA coating which is an oxylic melamine silane modified coating, melamine carbam coating, two part polyurethane coating and acid epoxy coating.

Working time is the time period after application to a substrate wherein the adhesive is sufficiently tacky to be applied to the surface of a second substrate bond with the second substrate. Preferably the sealant of the invention is formulated to provide a working time of 6 minutes or greater more preferably 10 minutes or greater. Preferably the working time is 15 minutes or less and more preferably 12 minutes or less. Molecular weights as described herein are determined according to the following procedure: determined using the Waters Model 590 Gel Permeation Chromatograph. This unit is connected to a multiwavelength detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column. The quoted molecular weights are weight average molecular weights unless otherwise specified.

In reference to polyurethane prepolymers, average isocyanate functionality is determined according to the following formula, $$\frac{(\text{moles diol-NCO adduct} \times \text{diol-NCO functionality}) + (\text{moles triol-NCO adduct} \times \text{triol-NCO functionality}) + (\text{moles excess polyisocyanate monomer} \times \text{its functionality})}{\text{moles diol-NCO adduct} + \text{moles triol-NCO adduct} + \text{moles excess polyisocyanate monomer}}$$

wherein moles excess polyisocyanate monomer are calculated according to the following formula, $$\text{moles of isocyanate} - (2 \times \text{moles of diol} + 3 \times \text{moles of triol})$$

and the moles of isocyanate, diol and triol are based on the amount of each in the starting formulation.

The theoretical average molecular weight of the prepolymer is calculated as equal to the average isocyanate functionality times the isocyanate equivalent weight of the prepolymer.

Functionality of the raw material is generally disclosed by the raw material supplier. It can be determined empirically by means of titrating the polyol or isocyanate to determine the average number functional group per molecule. One skilled in the art knows how to determine the functionality based on data developed by titration.

EXAMPLE 1

A polyether polyurethane prepolymer was prepared by thoroughly mixing 386 grams of a polyoxypropylene diol having an average molecular weight of 2000 and 559 grams of polyoxypropylene triol having an average molecular weight of 4500, in a 2-liter resin kettle equipped with a mechanical agitator, a nitrogen inlet adapter and a thermometer. Under nitrogen purge, the mixture was heated to 50 ° C. 170 grams of molten diphenylene methane 4, 4'diisocyanate were added to the mixture and the mixture thoroughly mixed. Then 0.1 gram of stannous octoate was introduced and the mixture was mixed for two hours. Finally, 484 grams of alkyl phthalate plasticizer and 16 grams of diethyl malonate were added to the mixture. The resulting prepolymer had an isocyanate content of 1.47 percent by weight.

EXAMPLE 2

A moisture curable sealant composition was prepared under anhydrous conditions by first degassing under agitation the mixture of 1089 grams of the prepolymer of Example 1, and 15 grams of N,N'bis((3-trimethoxysilyl) propyl) amine in a planetary mixer for 30 minutes. At this point, all the aminosilane was fully reacted with some isocyanate groups on the prepolymer. Then, to the above mixture, 65 grams of Desmodur N-3300 (an aliphatic polyisocyanate resin based on hexamethylene diisocyanate, supplied by Bayer USA Inc.) was charged and mixed for 10 minutes. Subsequently, 450 grams of dried carbon black was added, and mixed for 25 minutes under the reduced pressure of 30 inches of mercury. Finally, 14 grams of modified catalyst and about 6 g of organophosphite, was added and mixed for 10 minutes under the reduced pressure. The compounded sealant was filled into sealant tubes.

EXAMPLES 3–5

Several sealant compositions were prepared as described in Example 2 which were tested for adhesion as described below. The compositions and results of the testing are contained in the tables below

TABLE 1

| | Example 3* | Example 4 | Example 5 |
|---|---|---|---|
| Silanated NCO prepolymer | 69.899% | 69.899% | 69.899% |
| Carbon black | 29.328% | 29.328% | 29.328% |
| DMEE | 0.298% | 0.298% | 0.298% |
| NMP | 0.453% | 0.453% | 0.300% |
| Fomrez SUL-11A | 0.0224% | 0.0224% | 0.00% |
| Fomrez UL-28 | 0.00% | 0.00% | 0.0214% |
| Doverphos 7 | 0.00% | 0.338% | 0.00% |
| Doverphos 675 | 0.00% | 0.00% | 0.400% |

*Comparative
DMDEE is dimorpholino diethyl ether
NMP is n-methyl pyrollidone
Fomrez SUL-11A is dibutyl tin oxide.
Fomrez UL-28 is dimethyl tin carboxylate The Quick Knife Adhesion test was used to test the speed of the above sealant adhered to an acid resistant automotive coating system, Du Pont's Gen IVA coating. Gen IVA basecoat (~1.0 mil.) and clearcoat (~1.0 mil.) were sprayed on E-coated panels and baked at 255° F. oven for 27 min. Rectangle beads with size of 9×9×9 cm were layered on the panels three to four hours after their baking. The sealant beads were allowed to stay at ambient environment (21° C./30% RH) for three hours before being removed to low temperature environment (5° C./50% RH) for extended period. Adhesion was checked using quick knife method immediately after the indicated time. The cured bead is then cut with a razor blade through to the painted surface at 45 angle while pulling back the end of the bead at 180 angle. Notches are cut every 3 mm on the painted surface. The degree of adhesion is evaluated as adhesive failure (AF) and/or cohesive failure (CF). In case of adhesive failure, the cured bead can be separated from the painted surface, while in cohesive failure, separation occurs within the sealant bead as a result of cutting and pulling.

| | Days in Condition | Adhesion to panel | Days in Condition | Adhesion to panel |
|---|---|---|---|---|
| Example 3 | 3 | NA | 5 | 100% CF |
| Example 4 | 3 | NA | 5 | 100% CF |
| Example 5 | 3 | 70% | 4 | 100% CF |

Adhesion durability was tested by preparing peel samples, aging them at 110° C. for the indicated time, and performing the peel adhesion test by quick knife method. The peel samples were prepared by applying two-step glass primer to glass coupons followed by the application of a sealant bead and pressing to obtain desired thickness (2–3 mm). The samples were allowed to cure at 23° C./50% RH condition for 1 week before put into 110° C. oven. Samples were removed at 7, 15, 20, 24, 31 days and adhesion was tested.

| | Example 5 |
|---|---|
| 0 days | 100% CF |
| 7 days | 90% CF |

-continued

| | Example 5 |
|---|---|
| 15 days | 90% CF |
| 20 days | 85% CF |
| 24 days | 85% CF |
| 31 days | 90% CF |

Lap Shear Test:

A sealant approximately 6.3 mm wide by 8 mm high is applied along the width of the glass and approximately 6 mm to 12 mm from the primed end. The paint substrate is immediately placed on the sealant and the sample is allowed to cure at the condition of the 23° C. and 50 percent relative humidity for 7 days. The sample was then pulled at a rate of 1 inch/minute (2.5 cm/min)with an Instron Tester. The load at break of the sample is recorded.

Weather Testing

Weathering of the above sealant formulas were tested using Weather-O-Meter (WOM)conditions for 2000 hours and the lap shear test was performed. The WOM is operated according to SAE J1895 conditions. The samples are exposed continuously to the following cycles; 89° C. at 5 percent RH for 3.8 hours and 95 percent RH for 1 hour.

Sealants as described in Example 2 with various organo phosphites were applied to a primed coupon of glass having a fit the sealant is then bonded to coupons of steel coated with Du Pont Gen IV coating as described in Examples 3–5. The coupons are then exposed to the WOM conditions for extended periods of time as listed below. After the designated times, the coupons are subjected to lap shear testing as described below.

The phospbites used are described hereinafter. Phosphite 1 is available from Dover Chemical Corporation under the trademark and designation DOVERPHOS 6 and has the structure $C_{10}H_{21}O)_3P$. Phosphite 2 is available from Dover Chemical Corporation under the trademark and designation DOVERPHOS 10 and has the structure

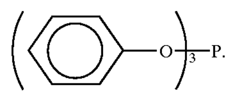

Phosphite 3 is available from Dover Chemical Corporation under the trademark and designation DOVERPHOS 49 and has the structure

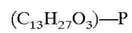

Phosphite 4 is available from Dover Chemical Company under the trademark and designation DOVERPHOS 675 and corresponds to the structure Gassing means air pockets are found in the adhesive bead after cutting.

Tunneling means a long air pocket is found in the bead.

EXAMPLE 11 to 16

Samples prepared as described in Example 2 using phosphites and different stabilizers as described below were wrapped in cheesecloth and placed in foil bags, with 100 nl of deionzd water. The foil bags were sealed and placed in an oven at 70° C. for 7 and 14 days respectively. After the designated time, each sample was placed in a freezer bag for 16 hours at −20° C. Thereafter the samples were subjected to ambient conditions for 2 hours then the peel test as described in Examples 3–5 was performed on each sample. Samples were thereafter subjected to ambient humidity for 5 and 9 days at 110° C. and the adhesion test was performed. The results are compiled in Table 3.

The adhesive compositions were also subjected to 110° C. at ambient humidities for varying times and the peel test was performed. Several different stabilizer compositions are used. Stabilizer 1 is available from Ciba Specialty Chemicals under the trademark and designation Tinuvin 765 and corresponds to the structure

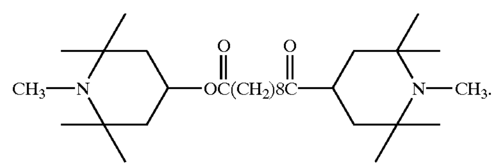

Stabilizer 2 is available from Ciba Specialty Chemicals under the trademark and designation Irganox 1135 and corresponds to the structure

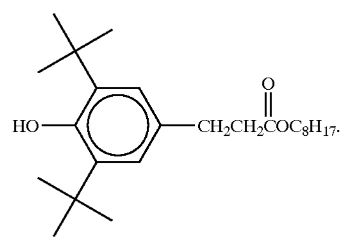

Stabilizer 3 is available from Dover Chemical Company under the trademark and designation Dovernox DD 9821 and is a 1:1 blend of dinonyl phenol and a compound which corresponds to the formula

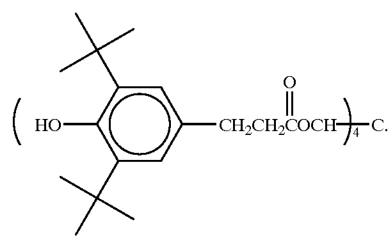

Stabilizer 4 is available for Ciba Specialty Chemicals under the trademark and designation Tinuvin 123 and corresponds to the formula

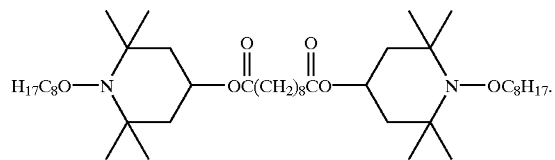

The results are compiled in Table 4.

TABLE 3

| Examples | Phosphite or Stabilizer | | Mode of Failure | 5D@110C | 9D@110C |
|---|---|---|---|---|---|
| 11 | none | 7 days | 100% CF/100% CF | | |
| | | 14 days | 100% CF | 90% CF/10% AF | 60% CF/40% AF |
| 12 | Stabilizer 1 | 7 days | 100% CF/100% CF | | |
| | | 14 days | 100% CF | 100% CF | 40% CF/60% AF |
| 13 | Stabilizer 3 | 7 days | 100% CF/100% CF | | |
| | | 14 days | 100% CF | 100% CF | 100% AF |
| 14 | Phosphite 4 | 7 days | 100% CF/100% CF | | |
| | | 14 days | 100% CF | 100% CF | 100% CF |
| 15 | Stabilizer 2 | 7 days | 100% CF/100% CF | | |
| | | 14 days | 100% CF | 100% CF | 20% CF/80% AF |
| 16 | Stabilizer 4 | 7 days | 100% CF/100% CF | | |
| | | 14 days | 100% CF | 100% CF | 10% CF/90% AF |

What is claimed is:

1. A sealant composition comprising (1) a urethane prepolymer having an isocyanate functionality of at least about 2.0 and a weight average molecular weight of at least about 2,000;

(2) a catalytic amount of a tin compound which catalyzes the reaction of isocyanate moieties with water or an active hydrogen containing compound; and (3) a stabilizing amount of an organophosphite which has an alkaryl ligand or both an aliphatic ligand and an aromatic ligand.

2. Sealants according to claim 1 wherein the organophosphite corresponds to one of the formulas $$P—(OR^1)_3 \text{ or}$$

$$(R^1O)_2—P—OR^2O—P—(OR^1)_2$$

wherein $R^1$ is independently in each occurrence alkyl or aryl; and $R^2$ is al independently in each occurrence alkylene, alkarylene or arylene;

with the proviso that $R^1$ and $R^2$ are selected such each phosphite has at least one alkaryl group or has at least one aryl and at least one alkyl group.

3. Sealants according to claim 2 wherein $R^1$ is independently in each occurrence $C_{6-18}$ alkyl; $C_{7-30}$ alkaryl or $C_{6-20}$ aryl; and $R^2$ is independently in each occurrence $C_{6-18}$ alkylene; $C_{7-30}$ aralkylene or $C_{6-20}$ arylene.

4. Sealants according to claim 3 wherein $R^1$ is independently in each occurrence $C_{6-12}$ alkyl and $R^2$ is independently in each occurrence $C_{7-30}$ aralkylene or $C_{6-20}$ arylene.

5. Sealants according to claim 2 which comprise (1) from about 30 to about 99.8 percent by weight of polyurethane prepolymer based on the weight of the sealant;

(2) from about 60 parts per million to about 1 percent by weight of a catalyst based on the weight of the sealant; and (3) from about 0.1 to about 1.0 percent by weight of an organic phosphite based on the weight of the sealant.

6. Sealants according to claim 2 wherein the polyurethane prepolymer further comprises silane functionality or a compound or polymer containing silane moieties.

7. Sealants according to claim 6 which comprise (1) from about 30 percent to about 98 percent by weight or less based on the weight of the sealant of a polyurethane prepolymer;

(2) from about 0.5 to about 20 percent by weight of a compound or prepolymer containing silane moieties;

(3) from about 60 parts per million to about 1.0 percent by weight based on the weight of the sealant of a compound which catalyzes the reaction of isocyanate moieties with water or an active hydrogen containing compound; and (4) from about 0.1 to about 1.0 by weight of an organophosphite based on the weight of the sealant.

8. A method of bonding glass to a substrate which comprises applying a sealant according to claim 6 to the glass surface or the substrate surface; contacting the glass and substrate such that the sealant is located between the glass and the substrate; allowing the sealant to cure so as to bond the glass to the substrate.

9. The method according to claim 8 wherein the organophosphite corresponds to one of the formulas $$P—(OR^1)_3$$

$$(R^1O)_2—P—OR^2O—P—(OR^1)_2$$

wherein $R^1$ is independently in each occurrence alkyl, alkaryl or aryl; and $R^2$ is independently in each occurrence alkylene, alkarylene or arylene;

with the proviso that $R^1$ and $R^2$ are selected such that each phosphite has at least one alkaryl group or has at least one aryl and at least one alkyl group.

10. The method according to claim 9 wherein the sealants in $R^1$ is independently in each occurrence $C_{6-8}$ alkyl; $C_{7-30}$ alkaryl or $C_{6-20}$ aryl; and $R^2$ is independently in each occurrence $C_{6-18}$ alkylene; $C_{7-30}$ aralkylene or $C_{6-20}$ arylene.

11. The method of claim 10 wherein sealants $R^1$ is independently in each occurrence $C_{6-12}$ alkyl and $R^2$ is independently in each occurrence $C_{7-30}$ aralkylene or $C_{6-20}$ arylene.

12. The method of claim 11 wherein the sealant comprises (1) from about 30 to about 99.8 percent by weight of polyurethane prepolymer based on the weight of the sealant;

(2) from about 60 parts per million to about 1 percent by weight of a tin catalyst based on the weight of the sealant; and (3) from about 0.1 to about 1.0 percent by weight of an organic phosphite based on the weight of the sealant.

13. The method of claim 11 wherein the substrate is an automobile.

14. A process for bonding glass to a substrate which comprises a) applying a primer to the surface of the substrate, b) applying a primer to the surface of the glass;

c) applying a sealant according to claim 1 to the surface of the glass or to the substrate;

d) contacting the glass with the substrate such that the sealant is disposed between the glass and the substrate.

15. The process according to claim 14 wherein sealants in the organophosphite corresponds to one of the formulas $$P—(OR^1)_3$$

$$(R^1O)_2—P—OR^2O—P—(OR^1)_2$$

wherein $R^1$ is independently in each occurrence alkyl, alkaryl or aryl; and $R^2$ is independently in each occurrence alkylene, alkarylene or arylene;

with the proviso that $R^1$ and $R^2$ are selected such that each phosphite has at least one alkaryl group or has at least one aryl and at least one alkyl group.

16. The process of claim 15 wherein wherein $R^1$ is independently in each occurrence $C_{6-18}$ alkyl; $C_{7-30}$ alkaryl or $C_{6-20}$ aryl; and $R^2$ is independently in each occurrence $C_{6-18}$ alkyl and $C_{7-30}$ aralkylene or $C_{6-20}$ arylene.

17. The process of claim 16 wherein wherein $R^1$ is independently in each occurrence $C_{6-18}$ alkyl and $R^2$ is independently in each occurrence $C_{7-30}$ aralkylene or $C_{6-20}$ arylene.

18. The process of claim 17 wherein the sealant comprises (1) from about 30 to about 99.8 percent by weight of polyurethane prepolymer based on the weight of the sealant;

(2) from about 60 parts per million to about 1 percent by weight of a catalyst; and (3) from about 0.1 to about 1.0 percent by weight of an organic phosphite based on the weight of the sealant.

19. The process of claim 18 wherein the substrate is an automobile.

* * * * *